US005532162A

United States Patent [19]

Aamot

[11] Patent Number: 5,532,162

[45] Date of Patent: Jul. 2, 1996

[54] ELIMINATION OF USED DEGREASING SOLUTION THROUGH BIOLOGICAL DEGRADATION

[76] Inventor: Haldor Aamot, Bahnhofstr. 39, Schwieberdingen, Germany

[21] Appl. No.: 346,145

[22] Filed: Nov. 29, 1994

Related U.S. Application Data

[63] Continuation-in-part of Ser. No. 944,699, Sep. 14, 1992, abandoned.

[51] Int. Cl.[6] ............................. C12S 9/00; C12S 11/00; C02F 3/02; C02F 3/00

[52] U.S. Cl. ......................... 435/264; 435/262; 210/601; 210/621

[58] Field of Search .................................. 435/262, 264, 435/261, 281, 248; 210/601, 612, 620, 621

[56] References Cited

U.S. PATENT DOCUMENTS 3,843,464 10/1974 Usami et al. .......................... 435/264
3,923,540 12/1975 Usami et al. .............................. 134/2

FOREIGN PATENT DOCUMENTS 0116151 5/1987 European Pat. Off. ........ C11D 11/00
0309432 3/1989 European Pat. Off. .......... C11D 3/38

*Primary Examiner*—Donald E. Czaja
*Assistant Examiner*—T. J. Reardon
*Attorney, Agent, or Firm*—McAulay Fisher Nissen Goldberg & Kiel

[57] ABSTRACT

A method for eliminating used aqueous degreasing or cleaning solutions in a closed rinsing system where the contaminated solution with its impurities and other agents is rinsed off the surfaces of the cleaned goods and organic matter including tensides is degraded by microorganisms contained within the rinse system. Further, a method for cleaning goods is provided which comprises cleaning these goods in a cleaning or degreasing system (either conventional or biologically active) followed by rinsing them in a closed system wherein during the rinsing step the cleaning solution and impurities are rinsed off the surfaces of the goods and organic matter including tensides is degraded by microorganisms contained within the rinse system. Finally spent degreasing and cleaning solution can be fed into the rinse bath where organic matter, contained in the solution, is degraded by the microorganisms, thus reducing the liquid waste load.

29 Claims, 1 Drawing Sheet

ELIMINATION OF USED DEGREASING SOLUTION THROUGH BIOLOGICAL DEGRADATION

This is a continuation-in-part of application Ser. No. 07/944,699 filed Sep. 14, 1992 and now abandoned.

BACKGROUND OF THE INVENTION a) Field of the invention

Industrial goods are typically cleaned and degreased during and after manufacturing, in preparation for the application of further surface treatment processes, in connection with their repair or maintenance during their lifetime or to preserve their appearance and functionality. The present invention relates to an improved method for cleaning and degreasing industrial goods including elimination of used degreasing solutions and impurities.

b) Background art

Cleaning and degreasing systems and methods used for such purposes are known. Earlier degreasing and cleaning systems often involve organic solvents. These solvents can be reused after separation from the impurities through redistillation. However, solvents pose an environmental problem because their vapor emissions are hazardous and the disposal of the impurities is complicated by their contamination with such solvents.

Cleaning and degreasing may be accomplished with less environmental impact through aqueous solutions, alkaline or acidic, which include tensides. The oils and greases are removed from technical products by emulsification or saponification with the tensides. Emulsification is separating the oil from the surface and breaking it up into microscopic droplets which become suspended in the solution. Saponification is dissolving the oils in the solution. The first produces an emulsion, the second a solution. To the extent that emulsified oils and undissolved solids are suspended in the degreasing solution it is not a true solution but a suspension. Nevertheless the term degreasing solution will be used generically, throughout this application, and this term will include both solutions and suspensions. Such aqueous solutions pose no problem with regard to harmful vapor emissions. However the separation of organic matter from the solution and the disposal of the organic matter and used solution do present severe practical problems due to the large volume of waste material which must be disposed of. In addition part of the degreasing solution is moreover carried out by the cleaned goods into subsequent treatment steps, which degrades their effectiveness.

Different methods have been proposed and are used to remove the organic content, especially the oils from such degreasing solutions.

One method is to skim floating oil drops off the surface of the solution. Oil floats in drops when the emulsifying capacity of the solution is exhausted due to saturation. This may also be purposely promoted by using a degreasing product with deliberately limited dispersing capacity for the emulsified oils. However this tradeoff limits the capacity of the degreasing product to separate the oil from the surface of the goods and to break it down for emulsification. In any case, skimming removes only part of the oil and it does not prevent the transport of degreasing solution into rinse baths and processes beyond. Neither oil nor tensides are eliminated.

Another method is to remove the emulsified oil by mechanical separation through filtration or centrifugation. This method can remove only emulsified oil, i.e. oil in suspension, while it cannot remove saponified oils, i.e. oils in solution. Therefore, mechanical separation removes only part of the oil and it does not prevent a transport of degreasing solutions into rinse baths and processes beyond. Neither oil nor tensides are eliminated.

Another method is to remove oils from the degreasing solution by chemical separation. The degreasing solution is demulsified by adding an appropriate agent e.g., another tenside. Tensides and impurities float to the surface and are skimmed off. New tensides are added to the solution to renew its emulsifying capacity and the refreshed solution is used again. This method does not prevent the transport of degreasing solution into rinse baths and processes beyond. Neither oil nor tensides are eliminated.

Still another method is to clean the rinse water by filtration through an activated carbon filter. This method is effective in removing organic materials, tensides and impurities, but it is useful only as a final cleaning stage. Without prior removal of the bulk of the organic material the carbon filter will immediately be overloaded and plugged. This method can be successful in preventing the transport of degreasing solution beyond the rinse stage but the procedure involved is expensive both in equipment and operating costs and oils and tensides are only separated and not eliminated.

Biological methods are a newer approach. EP 0 309 432 to Hakansson describes that a degreasing bath can be operated while maintaining a biological activity in the bath which eliminates the organic impurities by biological degradation. Bacteria mineralize the oils and greases. The best conditions are carefully chosen to control the bioactivity in such a way that only the impurities are eliminated. Elimination of the tensides is carefully avoided in order to preserve the degreasing bath. The degreasing bath is maintained at a pH of about 9 and at a temperature between 35° to 45° C. Hakansson also shows that a degreasing bath with higher pH and temperature may precede the biologically active bath in order to provide stronger degreasing action. In that case the second bath serves for the biodegradation of the impurities as above. The goods removed from either of the above mentioned baths are however contaminated with the degreasing solution which comprises organic matter such as oil, tensides and other impurities.

Though it has been proposed to spray water over the goods degreased according to any of the above methods in order to rinse off cleaning or degreasing liquid, it is not an applicable or appropriate solution because a large volume of rinsing liquid results which is contaminated with organic matter. This increases the amount of waste to be disposed of.

It is furthermore known to use closed-cycle-rinsing systems. However, when the rinse baths are closed-cycle-systems organic matter, tensides and further impurities accumulate in the rinsing solution, finally leading to a rinse solution which is too contaminated for further use. The rinse solution has then to be exchanged, and the used solution must be treated at a different site, again increasing the amount of waste to be treated.

But even before the rinsing solution is too contaminated for further use, organic matter, tensides and further impurities are present in the solution in continuously rising levels. These contaminants are carried over by the goods into further treatment processes leading eventually to goods of lower quality.

In the international application, published under the international publication No. WO 92/16314 Hakansson describes the use of his bioprocess in a device for cleaning objects.

The process uses an optional rinse stage after cleaning. However, the rinse water only dilutes the degreasing solution; it also gets transported into subsequent treatment baths and the environment beyond. This bioprocess is intended to eliminate organic impurities in connection with degreasing and cleaning but it does not prevent the transport of degreasing solution into processes beyond; tensides are not eliminated.

SUMMARY OF THE INVENTION

One problem addressed by the present invention is to provide a method for eliminating used cleaning and degreasing solutions before they are carried further on the surfaces of cleaned goods which are to be processed in pickling or other treatment solutions in order to ensure optimum effectiveness of the pickling or other treatment baths, to avoid large volumes of contaminated rinsing water, to minimize costs in recycling and disposing of the exhausted solutions and to reduce the impact on the environment.

It is therefore a primary object of the present invention to provide a novel method for eliminating used degreasing solutions by rinsing goods which have been cleaned in a degreasing or cleaning bath (either a conventional or a biological bath), wherein in a closed system the impurities and other agents are rinsed off the surfaces of the goods and organic matter is degraded by microorganisms contained within the rinse system.

It is a further object of the present invention to provide a method for cleaning goods which comprises cleaning these goods in a cleaning or degreasing system (either conventional or biologically active) followed by rinsing them in a closed system wherein during the rinsing step the impurities and other agents are rinsed off the surfaces of the goods and specifically in which organic matter is degraded by microorganisms contained within the rinse system.

It is a still further object of the present invention to provide a novel method to eliminate spent cleaning and degreasing solutions which comprises feeding spent cleaning and degreasing solution into a closed rinsing system and degrading the organic matter contained in the solution by microorganisms contained within the rinse system.

The cleaning and rinsing system of the present invention utilizes a rinse liquid in a bath into which the cleaned and degreased goods are immersed. Alternately, the rinse liquid is sprayed over the goods to be rinsed within a containment and collecting system. In either case the rinse liquid is kept in a closed system in contrast to an open flow through the rinse system. During the rinse step the impurities and other agents are rinsed off the surfaces of the goods and organic matter (tensides and impurities) is degraded by microorganisms contained within the rinse system. Thus, the rinsed goods do not carry over any organic matter into subsequent treatment steps because organic matter is eliminated in situ.

The rinse step may be preceded by a conventional or biologically active degreasing and cleaning step or a combination thereof.

Used cleaning and degreasing solution can be fed into the rinsing system where the organic matter, contained in the spent cleaning and degreasing solution is completely degraded by the microorganisms contained in the rinsing system.

DETAILED DESCRIPTION OF THE INVENTION

Figure 1:
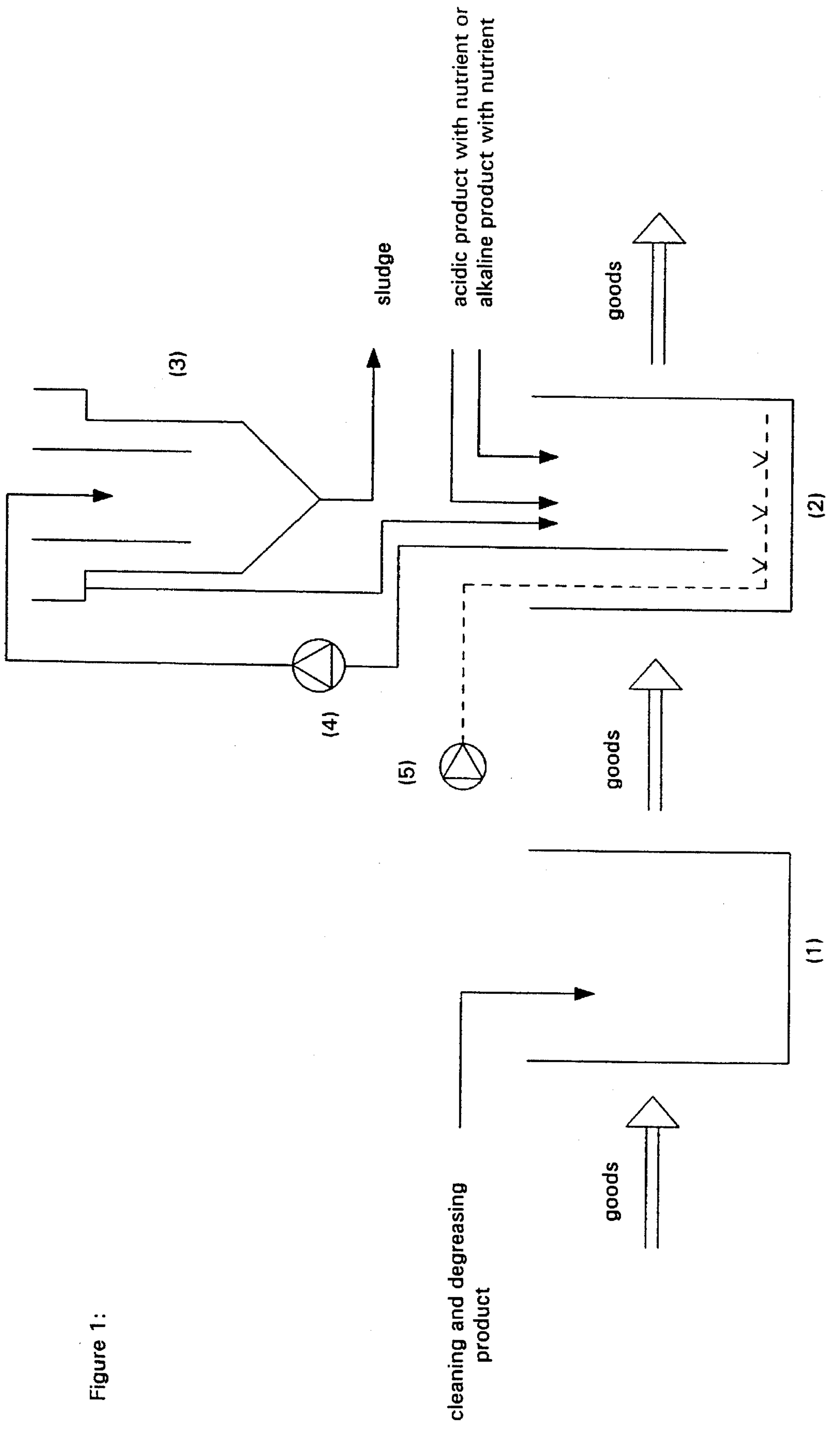
FIG. 1 is an illustration of one embodiment utilizing the rinsing system of the present invention.

The goods to be treated are usually metal products contaminated with cutting oils from mechanical fabrication like naphthenic base paraffin oil. An example of such oils is "WM3079 EP Langzeit Kühl- und Schneidmittel", available from WISORA, Bremen, Germany.

The goods can be cleaned in a first step by immersing them in a conventional cleaning and degreasing bath, which usually contains an aqueous degreasing mixture of tensides and inorganic salts. Such mixtures are commercially available in many combinations. The tensides are primarily noniogenic types such as fatty alcohol oxethylates, fatty acid oxethylates, and/or alkyl phenol oxethylates. Usually an anionic tenside such as alkane sulphonate alkyl aryl sulphonate, or -carboxylate or a cationic tenside such as an amine salt, a sulfonium salt or a quartenary ammonium salt is added thereto. The inorganic salts, which are referred to as a builder system, can contain phosphates, carbonates, possibly silicates, and caustic soda. A preferred degreasing mixture comprises 5 to 10% nonionic tensides, 2 to 4% cationic tensides, 5 to 10% phosphates and 2 to 20%, preferably 10 to 20% caustic soda. The product concentration in the bath is about 5 to 10%, the pH is about 13, and the bath temperature is about 60° C. An especially preferred degreasing mixture is Bio NA 40 a product available from Aamot GalvaChem, Germany which contains 10% of a mixture of alkyl polyglycol ether and aryl polyglycol ether (noniogenic), 1% fatty aminooxethylates (cationic), 10% sodium phosphates, the remainder being water, the mixture being used in the bath in a concentration of 4% in addition to 2% NaOH. 3–5 kg Bio Na 40, typically 4 kg Bio Na 40 and 1–3 kg NaOH, typically 2 kg NaOH are used per 1000m$^2$ of the surface of the goods.

The oils are cleaned off the goods and dispersed in the cleaning and degreasing solution. This step serves to remove particularly the hard to remove oils and greases with the help of the high temperature and alkalinity of the bath.

The goods can then be moved into a second cleaning and degreasing bath which is biologically active, Such a system is described in the European Patent Application EP-0 309 432 which is incorporated herein by reference. The bath utilizes the same degreasing mixtures as described above but no caustic soda. Its temperature is preferably maintained at about 38° C. and the pH is preferably maintained at about 9 by means of a solution containing either inorganic acids or caustic soda, salts and nutrients. Products used to maintain the pH preferably comprise a mixture of 15 to 25% caustic soda, 1 to 2% sodium-, potassium- and ammonium chloride, 1 to 2% sodium sulfate, -silicate and -phosphate, and 0.5 to 1% of glucose. An especially preferred product is Bio NA 10, a product available from Aamot GalvaChem, Germany, which contains 18% caustic soda 0.8% sodium chloride 0.5% potassium chloride 0.3% ammonium chloride 1% sodium metasilicate 0.5 di sodium phosphate 0.2 sodium sulfate 1% glucose, the remainder being water, and/or Bio NA 01, a product available from Aamot GalvaChem, Germany, comprising 50% phosphoric acid 1% hydrochloric acid 0.5% sulphuric acid 0.1% magnesium chloride 0.2% potassium chloride 1% ammonium chloride 2% glucose 1% yeast extract, the remainder being water.

The consumption of Bio NA 01 and Bio NA 10 typically lies in the range of one third of the consumption of Bio NA 40.

The goods are degreased in the bath for about 10 minutes and are then transfered into the rinsing system. The rinse bath is a closed system which comprises a rinse liquid and microorganisms. The microorganisms can enter the rinsing system with the oils on which they exist naturally. The microorganisms are such as the ones found in mineral oils:

Pseudomonas spp

*Pseudomonas pseudoalcaligenes*

*Pseudomonas alcaligenes*

*Alteromonas putrefaciens*

*Pseudomonas stutzeri*

Aeromonas spp

Enterobacteriaceae spp

Mycobacterium

*Klebsiella pneumoniae*

*Enterobacter agglomerans*

*Klebsiella oxytoca*

*Proteus vulgaris*

*Citrobacter diversus*

*Escherichia coli*

*Citrobacter freundii*

*Morganella morganii*

Thiobacillus spp

*Thiobacillus ferrooxidans*

*Aerococcus viridans*

*Cladisporium resinae*

Alkane oxidizing spp

Acinetobacter spp

Arthrobacter spp

Nocardia spp

Cyronebacterium spp

Xanthomonas spp

Brevibacterium spp and the ones found in synthetic oils:

Pseudomonas spp

*Pseudomonas pseudoalcaligenes*

*Pseudomonas alcaligenes*

*Pseudomonas fluorescens*

Pseudomonas putida

Acinetobacter spp

*Acinetobacter calcoaceticus*

Thiobacillus spp

*Thiobacillus thiooxidans*

*Flavobacterium odoratum*

Enterobacteriaceae spp

Bacillus spp

Alkane oxidizing spp

Arthrobacter spp

Nocardia spp

Corynebacterium spp

Xanthomonas spp

Brevibacterium spp.

A preferred microorganism is *Pseudomonas alcaligenes.* Of course, other suitable natural as well as genetically tailored microorganisms, which, example given, would additionally degrade silicon compounds including silicons, may be used as well.

The microorganisms may be added to the rinsing system prior to or during the operation of the rinse bath and/or with the goods to be treated. Preferably, the organisms used are introduced with the goods to be treated. Additionally or alternately, the rinse bath may also be vaccinated with microorganisms living in the sludge taken from other active baths or with cultures grown in a laboratory.

The condition of the rinse liquid has to be controlled carefully so as to foster the controlled biological activity which degrades the oils, greases, and other organic impurities including tensides and emulsifiers carried into the rinse liquid through the degreasing solution and removed from the surface of the goods and to sustain the microorganism population in the rinse bath. Without such control no suitably effective biological activity is possible.

The pH of the rinse system may be controlled by continuous measurements and by the dosage of alkaline or acidic additives, These additives can be dosed together with specific nutrients for the sustenance of the cultures best suited for the organic materials to be degraded, and other biologically degradable components for the conditioning of the rinse system. The pH of the rinse liquid is maintained between about 5.5 and 8.5, preferably about 8. It can be adjusted by means of a solution containing inorganic acids, salts and nutrients, e.g. a product comprising a mixture of 30% to 60% phosphoric acid, 1% to 2% of hydrochloric and sulphuric acid, 1% to 2% of magnesium-, potassium- and ammonium chloride and 2% to 5% of glucose and yeast extracts. A preferred solution is Bio NA 01. The consumption of Bio NA 01 typically lies in the range of one third of the consumption of Bio NA 40 in the conventional cleaning and degreasing bath.

The biological activity is stimulated and supported by keeping the rinse water temperature between 0° and 100° C. Usually a temperature of between 35° and 50° C. is preferred and a temperature between 40° and 45° C. is most preferred, but various soil colonizing bacteria grow at temperatures from near the freezing point up to about 35° C. On the other hand, thermophilic organisms may be used in the present method, and therefore temperatures up to the boiling point may be selected.

The biological activity is preferably stimulated and supported by nutrients. Even in the case where no organic material is carried into the rinse system, nutrients sustain a minimum population of microorganisms. Nutrients added are preferably those which are known to be best suited in supporting growth of the microorganisms used. On the other hand selection of specific nutrients may control the growth of microorganisms in such a way that growth of undesired bacteria is suppressed. The nutrients may be selected from carbon and nitrogen sources, phosphorous and/or sulfur containing compounds, inorganic salts and the like. Usually the nutrients are selected from the group comprising sugars, amino acids, ammonium salts of organic and inorganic acids, phosphorous containing compounds, sulphur containing compounds, and derivatives of carbonic acids. Preferred examples for such compounds are glucose, glutamat, glutamic acid, ammonium hydroxide, ammonium chloride, ammonium proprionate, phophatides, thioglycolates, urea and the like. Depending on the dosage of alkaline or acidic additives, respectively, in order to maintain the proper pH value, the nutrients are suitably selected, e.g. ammonium hydroxide or ammonium chloride, respectively. The selection will also be dependent on the oils, grease, and other organic and inorganic compounds which have been carried over into the bath together with the goods to be treated. In many cases the growth of microorganisms will depend on the nutrients added, since the impurities dragged into the rinse solution do not comprise all compounds necessary to sustain the microorganisms.

The biological activity is preferably stimulated and supported by aeration of the rinse system in order to supply oxygen to the microorganisms.

The rinse system may be kept clean and free from residue (including dead bacteria) and inorganic suspended matter by collecting and removing sludge through a settler or filter or by other appropriate means and known measures. This allows the bath liquid to be reused indefinitely, since substantially all the organic matter is degraded and removed as a sludge, increasing process efficiency while reducing the waste load.

One embodiment of the present invention will now be described referring to FIG. 1:

Equipment to carry out the invention comprises a cleaning and degreasing tank (1), a bio-rinse tank (2), a separator (3), a circulating pump (4), and a blower (5).

Products containing tensides for cleaning and degreasing and alkali are added to the cleaning and degreasing tank (1). Water is added as needed to keep the tank filled. The temperature of the liquid in the tank is maintained at the desired level.

The contaminated goods are immersed and washed in the cleaning and degreasing tank (1). The oils are emulsified or saponified. The impurities are dispersed in the liquid.

The washed goods are removed and dipped into the bio-rinse tank (2). Contaminated liquid from the cleaning and degreasing tank (1) is dragged into the bio-rinse tank (2) on the surface of the goods. The temperature of the liquid in the tank is maintained at the desired level and the liquid is aerated by means of blower (5) in order to support the aerobic activity of the microorganisms.

The liquid in the bio-rinse tank (2) is circulated through the separator (3) by means of circulating pump (4). Acidic or alkaline product with nutrients is added as needed to maintain the proper pH which tends to change due to the import of liquid from the cleaning and degreasing tank (1) and the biological activity. Sludge containing undissolved impurities and dead bacteria is removed.

It goes without saying that the process as described is not meant to limit the scope of the present invention.

In another embodiment a second cleaning and degreasing tank (now shown) is arranged between the first cleaning and degreasing tank (1) and the bio-rinse tank (2). The goods are passed from the first tank (1) to the second tank before being passed through the bio-rinse tank (2). In the second tank a biological activity is maintained in order to eliminate organic impurities but not the tensides. For this purpose the second tank (1*a*) has a separator, circulating pump, and blower the same as the bio-rinse tank (2).

In yet another embodiment used cleaning and degreasing liquid from a separate facility can be introduced into the bio-rinse tank (2). The used cleaning and degreasing liquid is being processed biologically to eliminate its impurities and tensides resulting again in a substantial reduction in the waste load. Thus, the bio-rinse tank (2) can serve more than one facility at a considerable reduction in total cost.

EXAMPLE 1

A preferred degreasing system is described which utilizes a cleaning and degreasing bath and the bio rinse system of the invention to eliminate the used degreasing solution with its impurities, thus preventing its transport into other processes and the environment.

The degreasing bath contains water, about 4% Bio NA 40 and 2% NaOH. It is maintained at a pH of about 13 and at a temperature of about 60° C. 3–5 kg Bio Na 40, typically 4 kg Bio Na 40 and 1–3 kg NaOH, typically 2 kg NaOH are used per 1000m$^2$ of the surface of the goods. The goods to be cleaned are steel products contaminated with about 0.5 g/m$^2$ WM3079 EP Langzeit Kühl- und Schneidmittel, available from WISORA, Bremen, Germany, a cutting oil for mechanical fabrication. The goods are immersed in the degreasing bath for a period of about 15 minutes whereby the oils are cleaned off the goods by and dispersed in the cleaning solution. As the clean goods are moved from the degreasing bath to the rinse bath a certain amount of contaminated cleaning solution is carried into the rinse bath by surface wetting. The rinse bath is an aqueous system which is maintained at a pH of about 8 by means of Bio NA 01 and which comprises *Pseudomonas alcaligenes* as the bacteria, which feed on the oils, greases, tensides and other organic impurities. The temperature of the rinse bath is maintained at about 43° C. and the bath is aerated by injecting air into it to promote aerobic activity. Control of temperature and pH is automated; aeration is continuous. The consumption of Bio NA 01 is about one third of the consumption of Bio NA 40.

The goods are immersed in the rinse bath for 10 seconds and are then removed for further processing. The goods do not carry over any contaminated solution.

Bacteria grow and multiply in the closed rinse system as they feed on the degreasing solution which is carried in on the surface of the goods, Organic matter is degraded by the bacteria—oils, tensides, and nutrients alike. Hydrocarbons are converted into carbon dioxide and water.

The sludge which accumulates in the baths is removed and collected in a suitable separator. It contains the inorganic impurities removed from the goods—particularly minerals and oxides—and dead bacteria.

EXAMPLE 2

A two-stage degreasing system is described which utilizes the biologically active degreasing process described by Hakansson in EP-A-88850310 following a first degreasing stage utilizing a hot alkaline solution. Finally, the bio rinse process of the invention eliminates the used degreasing solution carried on the surface of the goods, thus preventing its transport into other processes and the environment.

The degreasing system comprises three steps: a hot alkaline degreasing bath as in Example 1, which serves to remove particularly the hard to remove oils and greases with the help of its high temperature and alkalinity; a biologically active degreasing bath as described by Hakansson, which serves to extend the degreasing process and control the level of contamination with oil and grease. It uses the same degreasing product, Bio NA 40, but no caustic soda. Its temperature is maintained at about 38° C. and the pH is maintained at about 9 by means of a solution containing Bio NA 01; and a bio rinse bath as in Example 1.

The goods are first immersed in the hot degreasing bath for a period of about 10 minutes. They are then removed and immersed in the biologically active bath for the same duration. Finally, they are dipped into a rinse bath as described in example 1. After a few moments they are removed from the rinse bath for other processing.

Both the biologically active degreasing bath and the bio rinse bath are aerated by injecting air into them to support aerobic activity. In the biologically active degreasing bath, the oil which is removed and emulsified, as well as the oil being dragged into it from the alkaline degreasing bath, is being broken down by the bacteria and mineralized. Elimination of tensides is carefully avoided. The consumption of Bio NA 40 in the biologically active bath is only a fraction of the consumption in the hot degreasing bath because it is imported from the hot degreasing bath and continues to work effectively in the biologically active degreasing bath. The consumption of Bio NA 01 is less than in the bio-rinse bath in Example 1. In the rinse bath, the degreasing solution which is being dragged from the degreasing baths is being degraded completely by the bacteria—oils, nutrients, and tensides alike. The consumption of Bio NA 01 in the rinse bath is also less than in Example 1. The total consumption of bio NA 01 in the biologically active degreasing bath and the bio-rinse bath is about the same as in Example 1. The sludge which accumulates in the baths is collected in a suitable separator. It contains the inorganic impurities removed from the goods and dead bacteria.

By utilizing the present invention, contamination of subsequent treatment baths is avoided, increasing process efficiency and reducing environmental impact. The spent cleaning and degreasing solution can be fed as a side stream to the closed rinse system, to eliminate the need to dispose of this solution at a different waste treatment site. This substantially reduces the amount of dilute liquid waste to be removed, instead requiring only removal of a sludge.

While preferred embodiments of the invention have been shown and described, it will be understood by those skilled in the art that various modifications can be made without varying from scope of the invention.

What is claimed is:

1. A method for degrading organic matter and residual cleaning agent from a used cleaning and degreasing solution in situ comprising:

providing goods cleaned in an aqueous degreasing or cleaning bath, the goods containing organic matter and residual cleaning agent;

providing a closed rinsing system containing an aqueous rinse liquid which is recycled within the system;

placing the cleaned goods into the closed rinsing system;

providing microorganisms capable of degrading the organic matter and the residual cleaning agent contained on the goods in the rinse liquid;

controlling the condition of the rinse liquid to promote the growth of the microorganisms;

rinsing the goods with the aqueous rinse liquid such that the residual cleaning agent and organic matter are removed and dispersed in the rinse liquid; and using the microorganisms in the rinse liquid to degrade the cleaning agent and organic matter in the rinse liquid.

2. The method as claimed in claim 1, wherein the microorganisms are carried into the rinse liquid with the organic matter on the goods.

3. The method as claimed in claim 1, wherein the microorganisms are added to the rinsing liquid prior to or during rinsing of the goods.

4. The method as claimed in claim 3 wherein the microorganisms are naturally occurring microorganisms.

5. The method as claimed in claim 1, wherein the rinsing step includes immersing the goods in a bath.

6. The method as claimed in claim 1, wherein the rinsing step includes spraying the goods with rinse liquid and collecting the rinse liquid.

7. The method as claimed in claim 1, wherein the temperature of the rinsing liquid is maintained between 35° and 50° C.

8. The method as claimed in claim 1, wherein the pH of the rinsing liquid is maintained between 5.5 and 8.5.

9. The method as claimed in claim 8, wherein the pH of the rinsing liquid is at or near 8.

10. The method as claimed in claim 1, wherein the controlling step includes adding nutrients selected from the group consisting of carbon-, nitrogen-, phosphorus- and sulphurcontaining compounds and inorganic salts to the rinse liquid.

11. The method as claimed in claim 1 wherein the controlling step includes adding nutrients selected from the group consisting of sugars, amino acids, ammonium salts or organic and inorganic acids, and derivatives of carbonic acid to the rinse liquid.

12. The method as claimed in claim 1, wherein the controlling step includes adding nutrients selected from the group consisting of glutamate, glutamic acid, ammonium hydroxide, ammonium chloride, ammonium propionate, phosphatides, thioglycolates, and urea to the rinse liquid.

13. The method as claimed in claim 1, wherein the controlling step includes the step of aerating the rinse liquid.

14. The method as claimed in claim 1, further including the step of adding sludge or liquid separated from a rinse system run previously and containing microorganisms capable of degrading the organic matter to the rinse liquid prior to or during the rinsing step.

15. The method as claimed in claim 1, further including the step of adding other microorganisms capable of degrading the organic matter to the rinse liquid prior to or during the rinsing step.

16. The method as claimed in claim 1 further including the step of cleaning the goods prior to the rinsing step in an aqueous cleaning and degreasing system to substantially remove organic matter therefrom.

17. The method as claimed in claim 16 wherein the organic matter, removed from the goods during cleaning, is substantially degraded by microorganisms present in the aqueous cleaning and degreasing system.

18. The method as claimed in claim 16 wherein the step of cleaning the goods comprises as a first step cleaning the goods in an acidic or alkaline aqueous solution, and as a second step cleaning the goods in an aqueous solution comprising tensides, the organic matter removed from the goods being substantially degraded by microorganisms present in the aqueous cleaning and degreasing system.

19. A method for the degradation of spent cleaning and degreasing solution comprising:

providing a closed rinsing system containing a rinse liquid which is recycled within the system;

providing goods cleaned in an aqueous degreasing or cleaning bath, the goods containing organic matter and residual cleaning agent;

feeding spent cleaning and degreasing solution comprising residual cleaning agent and organic matter into the rinse system;

providing microorganisms capable of degrading the residual cleaning agent and the organic matter in the rinse liquid;

controlling the condition of the rinse liquid to promote the growth of the microorganisms;

rinsing the goods with the aqueous rinse liquid such that the residual cleaning agent and organic matter are removed and dispersed in the rinse liquid; and using the microorganisms in the rinse liquid to degrade the cleaning agent and organic matter.

20. The method claimed in claim 19, wherein the microorganisms are carried into the rinse liquid with the organic matter.

21. The method as claimed in claim 20, wherein the microorganisms are naturally occurring microorganisms.

22. The method claimed in claim 19, wherein the microorganisms are added to the rinsing liquid prior to or during rinsing of the goods.

23. The method as claimed in claim 19, wherein the pH of the rinsing liquid is maintained between 5.5 and 8.5.

24. The method as claimed in claim 23, wherein the pH of the rinsing liquid is at or near 8.

25. The method as claimed in claim 19, wherein the controlling step includes adding nutrients selected from the group consisting of carbon-, nitrogen-, phosphorus- and sulphur-containing compounds and inorganic salts to the rinse liquid.

26. The method as claimed in claim 19, wherein the controlling step includes adding nutrients selected from the group consisting of sugars, amino acids, ammonium salts or organic and inorganic acids, and derivatives of carbonic acid to the rinse liquid.

27. The method as claimed in claim 19, wherein the controlling step includes adding nutrients selected from the group consisting of glutamate, glutamic acid, ammonium hydroxide, ammonium chloride, ammonium propionate, phosphatides, thioglycolates, and urea to the rinse liquid.

28. The method as claimed in claim 19, wherein the temperature of the rinsing liquid is maintained between 35° and 50° C.

29. The method as claimed in claim 19, wherein the controlling step includes the step of aerating the rinse liquid.

* * * * *